May 10, 1932.  C. S. WEBBER ET AL  1,857,224
ELECTROLYTIC PROCESS FOR THE PURIFICATION OF ACETIC ACID SOLUTION
Filed Jan. 20, 1930
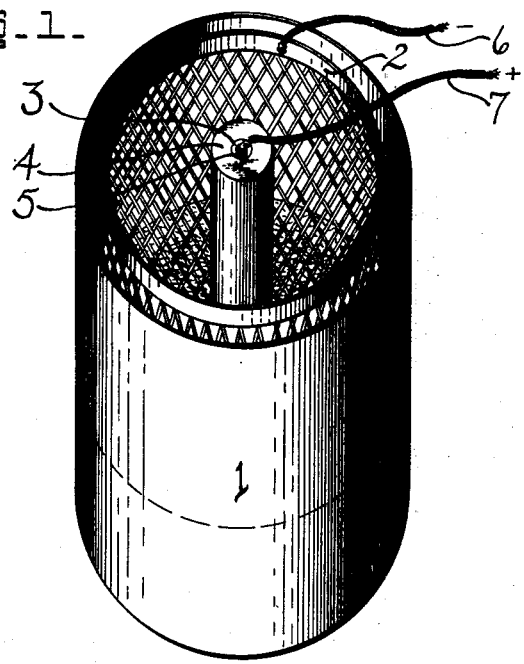
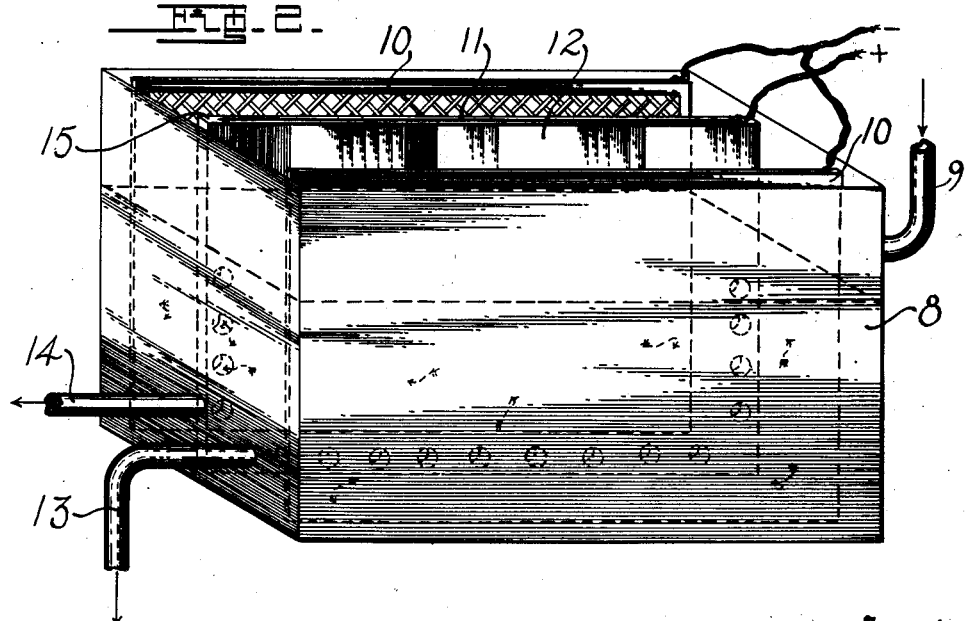
Inventors
Charles S. Webber
Cyril J. Staud
Harry LeB. Gray Patented May 10, 1932

1,857,224

UNITED STATES PATENT OFFICE

CHARLES S. WEBBER, OF SPRINGFIELD, MASSACHUSETTS, AND CYRIL J. STAUD AND HARRY LE B. GRAY, OF ROCHESTER, NEW YORK, ASSIGNORS TO EASTMAN KODAK COMPANY, OF ROCHESTER, NEW YORK, A CORPORATION OF NEW YORK

ELECTROLYTIC PROCESS FOR THE PURIFICATION OF ACETIC ACID SOLUTIONS

Application filed January 20, 1930. Serial No. 421,988.

This invention relates to an electrolytic process whereby acetic acid solutions may be purified from contaminating substances.

In the manufacture of cellulose acetate there may be added during the many steps of the process various types of mineral acids, salts and other ingredients for particular purposes, such for example, as catalysts in the esterification reaction or hydrolysis in the de-esterifying treatment of the cellulose triacetate. These added substances either of themselves or in the ionized form may attack the vessel in which the reactions are conducted whereby metallic salts are produced and, therefore, included in the mixture. In order to effect the acetylation of cellulose in an economical manner it is necessary that the acetic acid added to and that formed during the esterification of the cellulose be removed from the cellulose acetate, recovered and purified for further use.

In other manufacturing processes in which acetic acid is employed and in which ingredients necessary to effect the required reactions are added thereto, it is likewise essential that some means for removing these substances, and thereby rendering the acetic acid of sufficient purity for its use in subsequent reactions, be found.

After the separation of the acetic acid from the product formed, such as cellulose acetate from an acetylation bath, it would seem natural to effect this purification of the acetic acid by a simple distillation process. Such a method of purification would not prove satisfactory nor could the purification be conducted in a continuous manner successfully, due to the presence therein of the contaminating mineral acid, metal salts and other dissolved substances. It has been found desirable, therefore, to remove from the acetic acid prior to its distillation these contaminating constituents but up to time of the invention hereinafter disclosed no entirely successful method for their removal had been found.

Fig. 1 diagrammatically illustrates a discontinuous apparatus or electrolytic cell for carrying out this purification process.

Fig. 2 is likewise a diagrammatic drawing of a cell in which the impurities may be removed from the acetic acid in a continuous manner.

An object of the present invention is to provide a process for the electrolytic purification of acetic acid. Another object of this invention is the electrolytic purification of acetic acid solutions whereby the contaminating mineral acid salts and metallic, and other ionizable impurities contained in solution may be removed therefrom. Other objects will hereinafter appear.

It is well known that the anions of the organic acids, such as acetic acid, have a relatively low mobility in solution,—that is, the ion (in solution, of course) when subjected to an electrolytic current moves in that solution at a relatively slow rate when compared with the anions of particularly the mineral acids which have a high mobility.

The velocity of the chloride and acetate ions in solution or the speeds at which these ions travel when subjected to an electropotential of for instance one volt the electrodes being one centimeter apart and the temperature of the aqueous solution being 18° C., is, for the chloride ion 2.12 centimeters per hour and for the acetate ion 1.04 centimeters per hour; see "Introduction to Physical Chemistry", James Walker, Macmillan & Co., 1907, page 231. While it is not necessary that the degree of difference between the mobility of the two ions be as great as that between the chloride and acetate anion, nevertheless the greater the difference between their mobility the more thorough and rapid will be their separation. A difference of approximately 20% between the rates of mobility of the ions being separated is sufficient for the successful operation of our process nevertheless if several cells are used in series ions having an even lower difference may be successfully separated. As the acetic acid solutions recovered from an acetylation process generally contain hydrochloric acid, it will be seen from the above that we have in such a solution the very mobile and rapidly moving chloride ion and the slowly moving acetate ion in the same solution. We have found, therefore, that by using a correctly constructed electrolytic cell, it is possible to rapidly and thoroughly remove from the acetic acid solutions the more mobile ion and incidentally plate therefrom any contaminating metallic ions that may be present therein.

This reaction may be conducted in an electrolytic cell in which the anode is surrounded by a porous cell about which is placed in juxtaposition thereto the cathode. Any means which enables the electrolysis to be carried out so that the anions of rapid mobility have but a short distance to travel will be found useful in effecting this purification. As the time for completely removing the contaminating ingredients from the acetic acid solution is generally determined by the time required for the most distant rapidly moving anion to reach the anode portion of the cell, it is readily seen that any particular cell may be used in which the distance the anion must travel is reduced to a minimum.

From the above description of our process it is evident that many forms of apparatus may be employed for its successful operation, the two forms shown in the accompanying drawings being illustrative of typical species having exceptional advantages. Fig. 1 shows cell 1 which is constructed of any type of non-corrodible metal such as stainless steel or chromium plated steel or other metal or, for that matter, of enamelled or porcelain ware in which is placed the cathode 2 which covers the inside wall of the vessel and which may be constructed of brass or copper or other equally serviceable cathode material upon which the metallic salts may be plated. In the center of the cell is placed the anode compartment 3 which is surrounded by a porous cell 4 suspended in the center of which is the anode 5. Wires 6 and 7 conduct the negative and positive current from a power source, not shown, to the cathode and anode respectively. The anode may be constructed of a material which is not attacked by the anions which are drawn to it and we have found for this purpose that anodes of carbon or platinum are quite suitable.

Fig. 2 diagrammatically illustrates a continuous process for effecting this purification. While we here show but one cell a number of these cells in series may be utilized to thoroughly and efficiently remove even the last traces of the contaminating ingredients from the acetic acid or other acid having a slowly moving ion. The cell chamber 8, which may be constructed of material similar to that used in the above mentioned electrolytic cell, is fed through a conduit 9 by the impure acetic acid which flows into the cell in the direction of the arrow shown. The cathode surface 10 which lies close to the walls of the cell is separated from the anode surface 11 by the porous walls or cell 12. The acetic acid as it is slowly introduced into this cell gradually passes in the direction of the arrows and during its passage through the cell the anions, and primarily the more rapidly moving anions, pass through the porous wall 12 into the anode compartment 15. It is evident that the acetic acid solution as it flows to the exit conduit 13 becomes freed from the contaminating ingredients, the metallic constituents being plated upon the cathode surfaces 10. The separated anions such as the chloride or other mineral acid ions are removed from the anode compartment through the conduit 14. If required, for ultimate purification or in case the cell used does not remove the last portions of the impurities from the acetic acid, the partially purified acid from the conduit 13 may be passed through a second cell similar to the first. It is likewise possible that if the porous medium 12 be too porous a considerable amount of acetic acid will be found in the anode compartment 15. It may, therefore, be found advisable to pass the solution obtained from the anode compartment into a third cell similar to the first in order to recover therefrom some of the occluded acetic acid. These additional cells are not shown as their attachment to the conduits 13 and 14 and construction is obvious from the above description.

The porous tube or walls with which we surround the anode surface is composed of some material which is not attacked by the solution and while it resists the ready passage of the acetic acid solution into the anode portion it, nevertheless, due to its porosity, permits the transference of the very mobile anions therethrough. Due to the sluggish mobility of the acetic acid ion it is evident that it will be left behind in the cathode portion of the cell while the anode portion will contain substantially all of the chloride ions with, of course, a small percentage of the acetate ions. We have found that an anode cell of course alundum or similarly porous porcelain or other pervious material may be employed.

Our process for the purification of particularly acetic acid solutions will not be restricted to that acid solely but may be employed with any solute containing an anion having a relatively low mobility or any organic or inorganic acid solutions in which the anion has a very low mobility, such as that found in solutions containing aliphatic organic acids, or the mineral acids, such as boric or arsenious acid, in a solution of which these ions may be present with a more rapidly moving anion.

This process may likewise be utilized for the separation from solution of a mixture of solutes having cations of widely separating degrees of mobility. It is merely necessary in this instance to encase the cathode with the porous cell which is surrounded by the anode. An example in which such a separation is useful is for the separation of strontium from the lithium ions, which exist in the same solution, the former having the higher ion mobility.

This process is likewise useful for the separation of a mixture of salts in solution containing both a slowly and rapidly moving cation and anion. By superposing a porous medium before both the cathode and anode and electrolyzing, the slowly moving ions will remain in the central portion of the cell and the rapidly moving cation and anions will be found transferred to their respective electrodes. An acid solution containing both zinc sulfate and ammonium cyanide can be readily separated by this process. The ammonium cyanide remaining in the central portion of the cell.

As the distance between the anode and the cathode surfaces is relatively small and although the resistance of the acetic acid solution is relatively high, the current density required to separate from the acetic acid solution the metallic and non-metallic impurities is found to be in the neighborhood of from .2 to .3 amperes per square centimeter for 30% acetic acid solutions containing mineral acids,—for other solutions the optimum current density will vary with the particular solution.

As an example of the efficiency of this method of purification, and by which we will not be restricted either as to proportions or equivalents unless they be indicated in the appended claims, we have purified an acetic acid solution of 30% acetic acid in approximately 70% water which was recovered from a completed acetylating process and which contained both chlorides and copper salts by electrolyzing this acetic acid solution in a container as shown in Fig. 1, by applying thereto a current of 2 amperes and a voltage of from 20 to 84, giving a current density of .2 to .3 amperes per square centimeter. The chlorides and copper were completely removed as indicated by tests of the solution in the anode compartment and the cathode compartment; in 12 hours all the chlorides and the blue copper ion color was entirely discharged from the cathode compartment.

Various changes may be made in the type of electrolytic cell used for carrying out this purification reaction or in the type of solution purified providing that solution contains both a very mobile ion and an ion having a slower mobility with or without the presence of metallic salts therein without departing from this invention or sacrificing any of the advantages that may be derived from its use.

What we claim as our invention and desire to be secured by Letters Patent of the United States is:

1. A process for the purification of a solution comprising only electrolytes containing ions having a high mobility and ions having low mobility these ions having the same polarity which comprises electrolyzing such solution by removing therefrom the more mobile ions, these ions traversing but a relatively short path through a porous cell to their respective electrode.

2. A process for the purification of a solution comprising only electrolytes containing anions having a high mobility and anions having low mobility which comprises electrolyzing such solution by removing therefrom the more mobile anions, these anions traversing but a relatively short path through a porous cell to the anode.

3. A process for the purification of solutions comprising only electrolytes containing ions whose difference in mobility is approximately 20% which comprises electrolyzing the solution by removing therefrom the more mobile ions, these ions traversing but a relatively short path through a porous cell to their respective electrode.

4. A process for the purification of solutions comprising only electrolytes containing anions whose difference in mobility is approximately 20% which comprises electrolyzing the solution by removing therefrom the more mobile anions, these anions traversing but a relatively short path through a porous cell to the anode.

5. A process for the purification of acetic acid which comprises electrolyzing the acetic acid solution containing highly mobile ions by removing therefrom the highly mobile ions, these ions traversing but a relatively short path through a porous cell to the anode.

6. A process for the purification of acetic acid containing a mineral acid which comprises electrolyzing the acetic acid solution by removing therefrom the anion of the mineral acid, this anion traversing but a relatively short path through a porous cell to the anode.

7. A process for the purification of acetic acid containing hydrochloric acid which comprises electrolyzing the acetic acid solution by removing therefrom the chloride ion, this chloride ion traversing but a relatively short path through a porous cell to the anode.

8. A process for the purification of acetic acid containing metallic and non-metallic impurities which comprises electrolyzing the acetic acid solution by removing therefrom the more mobile non-metallic anions, these anions traversing but a relatively short path through a porous cell to the anode and the metallic impurities being plated on the cathode.

9. A process for the purification of acetic acid containing a mineral acid and metallic impurities which comprises electrolyzing the acetic acid solution by removing therefrom the anions of the mineral acid, these anions traversing but a relatively short path through a porous cell to the anode, the metallic cations being plated on the cathode.

10. A process for the purification of acetic acid which comprises continuously feeding the acetic acid solution into an electrolyzing cell, removing from the cathode portion of the cell the more mobile anions to the anode compartment, the anions traversing but a relatively short path through a porous cell to the anode compartment, and continuously removing the purified acetic acid from the cathode portion and the separated anions from the anode portion.

11. A process for the purification of acetic acid which comprises electrolyzing a 30% solution thereof containing hydrochloric acid and metallic impurities by subjecting it to a current density of approximately .25 amperes per square centimeter, the chloride ions passing but a relatively short path through a porous cell to the anode and the metallic cations plating out on the cathode.

12. A process for the purification of a solution comprising only electrolytes containing anions having high and low mobility and cations having high and low mobility which comprises removing therefrom the more mobile ions, these ions traversing but a relatively short path through a porous cell to their respective electrodes.

Signed at Springfield, Mass., this 7th day of January, 1930,

CHARLES S. WEBBER.

Signed at Rochester, New York, this 15th day of January, 1930.

CYRIL J. STAUD.
HARRY LE B. GRAY.